No. 813,028. PATENTED FEB. 20, 1906.
J. M. THOMPSON.
SEWER CLEANER.
APPLICATION FILED AUG. 7, 1905.

Witnesses:—
E. A. Volk.
R. W. Runser.

Inventor,
J. M. Thompson
by Wilhelm, Parker & Hard.
Attorneys.

UNITED STATES PATENT OFFICE.

JOHN M. THOMPSON, OF BUFFALO, NEW YORK, ASSIGNOR OF ONE-HALF TO THOMAS W. KENNEDY AND ONE-FOURTH TO WILLIAM N. LA TOUR, OF BUFFALO, NEW YORK.

SEWER-CLEANER.

No. 813,028.     Specification of Letters Patent.     Patented Feb. 20, 1906.

Application filed August 7, 1905. Serial No. 273,147.

*To all whom it may concern:*

Be it known that I, JOHN M. THOMPSON, a citizen of the United States, residing at Buffalo, in the county of Erie and State of New York, have invented a new and useful Improvement in Sewer-Cleaners, of which the following is a specification.

This invention relates to devices for cleaning sewers of that kind which are passed through the sewer to dislodge and remove any obstructing accumulations, and has for its object to provide a sewer-cleaner which will effectually cut away all roots and other growth from the inside of the sewer and at the same time remove the same and all dirt and other debris which may have accumulated therein.

Heretofore various devices have been employed for cutting the roots from the sides of the sewer; but such devices do not remove the roots and debris, and it is necessary to employ other means to clean the sewer after the root-cutter has been passed through. By employing a device which will both cut the roots and remove the accumulated debris from the sewer in one operation the trouble and expense of cleaning a sewer are greatly reduced.

Figure 1:
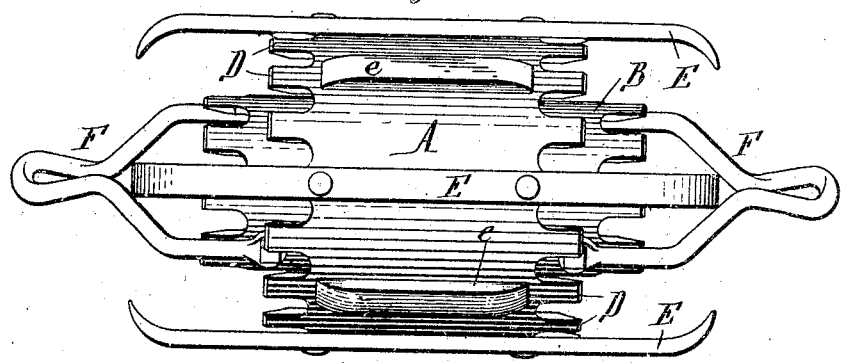
Figure 2:
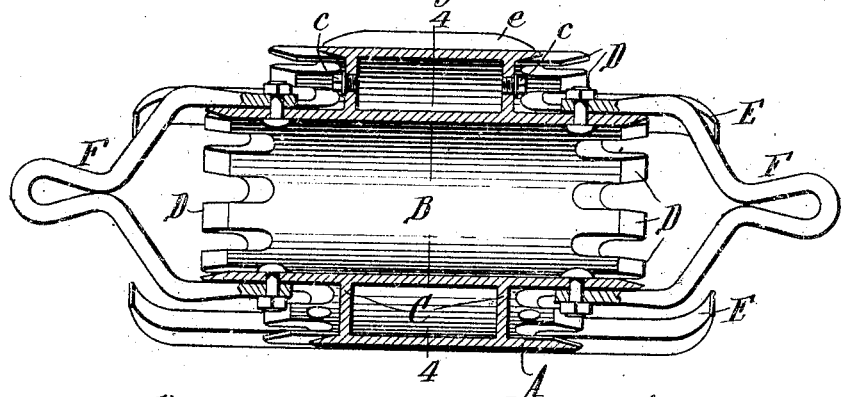
Figure 3:
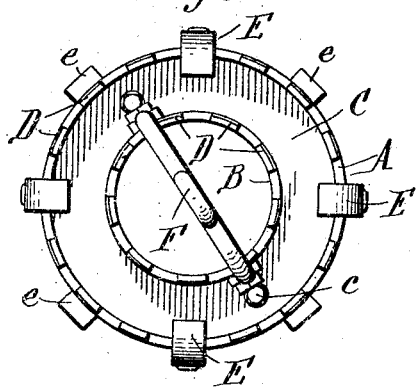
Figure 4:
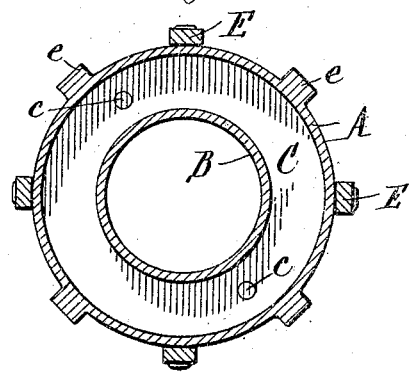

In the accompanying drawings, Figure 1 is a side elevation of a sewer-cleaner embodying the invention. Fig. 2 is a longitudinal sectional elevation of the same. Fig. 3 is an end view thereof. Fig. 4 is a cross-section in line 4 4, Fig. 1.

Like letters of reference refer to like parts in the several figures.

The device consists of an outer cutting shell or cylinder A and an inner cutting shell or cylinder B, connected together near their ends by annular walls or webs C. The two cylinders and their connecting-webs C can be cast in one piece, as shown, or constructed in any other suitable manner. The inner cylinder B is of smaller diameter and of greater length than the outer cylinder, and its ends extend in both directions beyond the ends of the outer cylinder. The inner cylinder is hollow, permitting the passage therethrough of water and other liquid matter which may be in the sewer.

The webs C, connecting the outer and inner cylinders, are substantially imperforate, the holes formed therein in casting the device being stopped by plugs c or other suitable means. The ends of both the outer and inner cylinders are notched to form the cutting-teeth D, the teeth and the notched portions of the cylinders between them being beveled outwardly and sharpened to form sharp cutting edges. The outer cutting-cylinder A is somewhat smaller in diameter than the sewer which it is intended to clean and is provided at intervals about its circumference with longitudinally-extending shoes or runners E. These shoes are of sufficient thickness to keep the outer cylinder from coming into direct contact with the sides of the sewer and extend beyond the ends of the outer cylinder and have their ends turned inwardly, so that they will pass over any projection or obstruction which may be encountered along the sides of the sewer without catching upon the same. In the construction shown four of the shoes are employed; but it is obvious that a greater number of shoes may be employed, if desired. In general use, however, when a cleaner of suitable size is employed it will be found that four of these shoes placed at equal distances about the circumference of the outer cylinder will be sufficient to keep the edges of the outer cylinder from encountering the sides of the sewer; but when a cleaner of small size is used in a large sewer it will be necessary to increase the number of shoes or provide some other means to prevent the outer cylinder from striking the edges of the sewer. The disadvantage of employing a greater number of shoes on a cylinder of small size is that the inwardly-turned ends of the shoes tend to encounter the accumulated debris in the sewer and impede the progress of the cleaner through the sewer instead of allowing the teeth of the cylinders to cut into and loosen up the debris. To obviate this difficulty short secondary shoes or runners *e* are provided on the circumference of the outer cylinder A at points equidistant between the long shoes E. These secondary shoes are of the same thickness as the shoes E, but are somewhat shorter than the outer cylinder and have their ends beveled toward the cylinder, so as to readily ride over projections in the sewer-pipe encountered thereby. These secondary shoes serve to supplement the action of the main shoes in holding the outer cylinder off of the sides of the sewer and at the same time have no projecting ends to interfere with the progress of the cleaner. The short shoes e can be conveniently cast in one piece with the cylinders A and B, and they are so represented in the construction shown, while the long shoes E preferably consist of separate pieces riveted or otherwise secured to the outer cylinder. The short shoes could, however, also be formed by separate pieces secured to the outer cylinder.

F represents bails or straps secured to the opposite ends of the cleaner for the attachment of the chains or ropes by which the cleaner is drawn through the sewer. In the cleaner shown the bails are pivoted to the projecting ends of the inner cylinder.

The operation of the device is as follows: The draft rope or chain, to which the cleaner is attached, is passed through the sewer from one manhole to the next in any usual or suitable way. The cleaner is then drawn through the sewer. The inner cylinder first encounters the obstructing matter or debris in the sewer and cuts away the center thereof. The outer cylinder then cuts away the debris about the sides of the sewer, and the web connecting the cylinders serves to hold this material which has been cut away and force the same ahead of the cleaner and out of the sewer. The inner cylinder, being extended beyond the ends of the outer cylinder, serves to considerably loosen and break up the material in the sewer before the same encounters the outer cylinder, thus making the device more easy of operation. It also serves to draw taut those roots which it does not immediately cut away, so that they are readily cut off by the cutting edges of the outer cylinder. The cleaner carries before it all the accumulated mass of roots and debris and forces the same out into the manhole, where they may be removed.

I claim as my invention—

1. In a sewer-cleaning device, the combination of a shell or cylinder provided with a cutting edge, and a second cutting edge arranged in advance of the former and disposed inwardly therefrom, substantially as set forth.

2. In a sewer-cleaning device, the combination of inner and outer connected shells or cylinders having cutting end edges, substantially as set forth.

3. In a sewer-cleaning device, the combination of inner and outer spaced shells or cylinders having cutting end edges, and means between the shells or cylinders for preventing the passage of material therethrough, substantially as set forth.

4. In a sewer-cleaning device, the combination of inner and outer spaced shells or cylinders having cutting end edges, and imperforate annular walls or webs connecting such shells or cylinders, substantially as set forth.

5. In a sewer-cleaning device, the combination of inner and outer connected shells or cylinders having cutting end edges, said inner shell or cylinder being of greater length than said outer shell or cylinder, substantially as set forth.

6. In a sewer-cleaning device, the combination of inner and outer connected shells or cylinders having serrated cutting end edges, the cutting edge of the inner cylinder being arranged in advance of the cutting edge of the outer cylinder, substantially as set forth.

7. In a sewer-cleaning device, the combination of a shell or cylinder having a cutting edge, longitudinal shoes on the cylinder extending beyond the ends thereof, and an attaching device for draft means connected to the cylinder, substantially as set forth.

Witness my hand this 1st day of August, 1905.

JOHN M. THOMPSON.

Witnesses:
EDWARD C. HARD,
A. L. McGEE.